United States Patent
Xu et al.

(10) Patent No.: US 9,314,781 B2
(45) Date of Patent: Apr. 19, 2016

(54) CATALYST FOR SELECTIVE PARAFFIN ISOMERIZATION AND PREPARATION METHOD AND USE THEREOF

(75) Inventors: Huiqing Xu, Liaoning (CN); Quanjie Liu, Liaoning (CN); Liming Jia, Liaoning (CN); Xiwen Zhang, Beijing (CN); Wei Wang, Beijing (CN)

(73) Assignees: CHINA PETROLEUM & CHEMICAL CORPORATION, Beijing (CN); FUSHUN RESEARCH INSTITUTE OF PETROLEUM AND PETROCHEMICALS, SINOPEC, Fushun, Liaoning (CN)

( * ) Notice: Subject to any disclaimer, the term of this patent is extended or adjusted under 35 U.S.C. 154(b) by 350 days.

(21) Appl. No.: 13/858,964

(22) PCT Filed: Oct. 13, 2011

(86) PCT No.: PCT/CN2011/001716
§ 371 (c)(1),
(2), (4) Date: Apr. 9, 2013

(87) PCT Pub. No.: WO2012/048533
PCT Pub. Date: Apr. 19, 2012

(65) Prior Publication Data
US 2013/0248415 A1    Sep. 26, 2013

(30) Foreign Application Priority Data
Oct. 13, 2010   (CN) .......................... 2010 1 0509102

(51) Int. Cl.
| | | |
|---|---|---|
| *B01J 29/74* | (2006.01) | |
| *C10G 45/62* | (2006.01) | |
| *C10G 45/64* | (2006.01) | |
| *C10G 71/00* | (2006.01) | |
| *B01J 29/70* | (2006.01) | |
| *B01J 29/06* | (2006.01) | |
| *B01J 21/06* | (2006.01) | |

(52) U.S. Cl.
CPC .......... *B01J 29/7484* (2013.01); *B01J 29/7092* (2013.01); *C10G 45/62* (2013.01); *C10G 45/64* (2013.01); *C10G 71/00* (2013.01); *B01J 21/066* (2013.01); *B01J 2229/18* (2013.01); *B01J 2229/20* (2013.01); *B01J 2229/42* (2013.01); *C10G 2400/10* (2013.01)

(58) Field of Classification Search
CPC ........ B01J 29/06; B01J 29/061; B01J 29/068; B01J 29/7042; B01J 29/7049; B01J 29/7092; B01J 29/7284; B01J 29/7484
See application file for complete search history.

(56) References Cited

U.S. PATENT DOCUMENTS

| | | | | |
|---|---|---|---|---|
| 4,046,711 | A * | 9/1977 | Antos .................... | B01J 23/624 208/139 |
| 4,481,177 | A * | 11/1984 | Valyocsik ..................... | 423/706 |
| 4,814,543 | A * | 3/1989 | Chen et al. .................... | 585/739 |
| 5,182,242 | A * | 1/1993 | Marler ............................ | 502/66 |
| 6,326,328 | B1 * | 12/2001 | Matsuzawa ............ | B01J 27/053 502/217 |
| 2004/0065582 | A1 * | 4/2004 | Genetti et al. .................. | 208/27 |

FOREIGN PATENT DOCUMENTS

| | | |
|---|---|---|
| CN | 1094995 A | 11/1994 |
| CN | 1609175 A | 4/2005 |
| CN | 101173193 A | 5/2008 |
| EP | 1172348 A1 | 1/2002 |

OTHER PUBLICATIONS

Gao, Xiao et al. "Preparation of Zirconia—Alumina Mixed Oxides and Their Application as Catalyst Support" Industrial Catalysis. Mar. 2008. vol. 16, No. 3, pp. 24-29.

* cited by examiner

*Primary Examiner* — Brian McCaig
(74) *Attorney, Agent, or Firm* — Novick, Kim & Lee, PLLC; Allen Xue

(57) ABSTRACT

The present invention discloses a catalyst for paraffin isomerization, as well as a preparation method and use thereof. The catalyst comprises a TON molecular sieve modified by rare earth, an inorganic refractory oxide modified by zirconium oxide and a noble metal of group VIII. The weight ratio of the TON molecular sieve modified by rare earth to the inorganic refractory oxides modified by zirconium oxide is 10:90 to 90:10, and the content of the metal of group VIII is 0.1 to 10 wt % based on the metal. When used in the process of isomerization dewaxing of various raw materials containing paraffins, the catalyst can not only decrease the solidifying points of raw oil containing paraffins, but also increase the yield of liquid products. Particularly, when used in the process of isomerization dewaxing of lubricating oil distillates, the catalyst is advantageous in producing base oil for lubricating oil with a high a higher yield, a lower pour point (solidifying point) and a higher viscosity index.

7 Claims, No Drawings

CATALYST FOR SELECTIVE PARAFFIN ISOMERIZATION AND PREPARATION METHOD AND USE THEREOF

TECHNICAL FIELD

The present invention relates to a catalyst for isomerization, specifically relates to a catalyst for paraffin shape-selective isomerization. The present invention also relates to a preparation method and use of the above catalyst.

TECHNICAL BACKGROUND

Raw oil containing wax mainly comprises diesel oil, atmospheric gas oil (AGO), vacuum gas oil (VGO), white oil, hydrocracking tail oil, lubricating oil distillate, and so on, wherein said wax is long chain n-alkanes or long chain hydrocarbons with a small amount of short side chains, comprising long chain alkanes, long chain aromatics and alkylcycloalkanes with a small amount of short side chains. Raw oil containing wax, especially heavy distillate resulted from paraffin-based crude oil, comprises a lot of wax with a high solidifying point and poor fluidity rate at low temperatures. As a result, the wax will make the oil thicken or even solidify with the decrease of the ambient temperature during the storage, transport and usage processes, which will block the oil pipeline and disturb the oil supply to the engine to cause the engine to fail. Now, there are many methods for solving various problems caused by the solidification of wax in raw oil containing wax, the mainly method being dewaxing, comprising solvent dewaxing, catalytic dewaxing and isomerization dewaxing.

The solvent dewaxing method means removing the wax by the solubility of wax in a solvent, the defects of which are the difficulty in solvent selection, the waste of a large amount of solvent, its harmfulness to people's health and the pollution to the environment, the high cost of equipment investment and operation, and the restriction of product quality by raw material.

The catalytic dewaxing method means using the catalyst with the shape-selection cracking function to make the wax component in the distillate to be selectively and catalytically cracked to generate smaller molecular hydrocarbons. For example, U.S. Pat. No. 4,247,388 and U.S. Pat. No. 4,659,311 disclose the usage of the catalytic dewaxing method to remove the wax in the lubricating oil. The defects of such method are that as a large amount of macromolecular compounds with high value are converted into smaller molecular materials with low value, the yield of base oil is low, the loss of viscosity index is great, and the value of byproducts is low.

The isomerization dewaxing method means only the macromolecular wax is allowed into the unique channel structure of the catalyst containing molecular sieves to carry out the isomerization to generate isoparaffins so as to obtain the effect of selective dewaxing. The isoparaffins have lower solidifying points and lower pour points when compared with wax of the same molecular weight, and they remain in the heavy distillate. The isomerization dewaxing method can decrease the solidifying point. At the same time, it can make the raw oil to have a high viscosity index and improve the yield greatly when compared with the above two dewaxing methods. The isomerization dewaxing method aims to convert the wax with a high melting point to isoparaffins with low melting points. However, the melting points of alkanes with high isomerization degree are high, so the isomerization degree of wax molecular should be controlled. As a result, the acid properties and pore structure of acidic components and hydrogenation components in the catalyst are strictly required. Generally, the acidic components should have a pore structure with moderate intensity, large acid amount and space limitation function, and the active metal components should have a fast hydrogenation/dehydrogenation activity to prevent further isomerization and even cracking of tert-carbocations.

Now, there are a lot of reports about the isomerization dewaxing catalyst. For example, U.S. Pat. No. 5,990,371, U.S. Pat. No. 5,833,837, U.S. Pat. No. 5,817,907, U.S. Pat. No. 5,149,421, U.S. Pat. No. 5,135,638, U.S. Pat. No. 5,110,445, U.S. Pat. No. 4,919,788, U.S. Pat. No. 4,419,420, U.S. Pat. No. 4,601,993, U.S. Pat. No. 4,599,162 and U.S. Pat. No. 4,518,485 relate to the isomerization dewaxing technology, wherein the used acidic components are mainly mordenites, SAPO-11, SAPO-31, SAPO-41, ZSM-23, SSZ-32, TON molecular sieves and so on, TON molecular sieves being mainly ZSM-22, Nu-10, KZ-2, ISI-1 and so on. Although the above materials have acidic centers of moderate strength, pore structures matching with wax moleculars, obvious space limitation on multi-branched chain isomers, and can make the paraffins to be isomerized to a certain extent, most acidic centers are covered in the preparation of a catalyst. As a result, the acidity of the obtained catalyst is weak, and the activity and selectivity thereof are low. In addition, the stability of a catalyst is closely related with its acidity. A catalyst with high acidity has strong resistance to sulfonitriding poisoning and has good stability, but promotes side reactions more easily, such as cracking reaction.

SUMMARY OF INVENTION

The present invention aims to overcome the insufficiency in the prior art, and provides a catalyst for paraffin isomerization with high activity and good selectivity. When said catalyst is used for the shape-selection isomerization of paraffins, it can not only reduce the solidifying points of raw oil containing paraffins, but also improve the yield of liquid products. Especially when said catalyst is used in the shape-selection isomerization dewaxing process of lubricating oil, it can improve the yield and the viscosity index of the base oil for lubricating oil. The present invention also provides the preparation method and use of the above catalyst.

The present invention provides a catalyst for paraffin isomerization, comprising a TON molecular sieve modified by rare earth, an inorganic refractory oxide modified by zirconium oxide and a noble metal of group VIII.

In the above catalyst, the weight ratio of said TON molecular sieve modified by rare earth and said inorganic refractory oxide modified by zirconium oxide is 10:90 to 90:10, preferably 30:70 to 80:20; the content of said metal of group VIII, based on said metal of group VIII, is 0.1 to 10 wt %, preferably 0.2 to 5.0 wt %.

In the above catalyst, the content of rare earth oxides in said TON molecular sieve modified by rare earth is 0.5 to 60.0 wt %, preferably 10.0 to 40.0 wt %; and the content of zirconium oxide in the inorganic refractory oxide modified by zirconium oxide is 0.1 to 50.0 wt %, preferably 5.0 to 30.0 wt %.

In the above catalyst, said TON molecular sieve can be any molecular sieve with a TON structure, it can be a commercial molecular sieve or a prepared one by known methods. For example, said TON molecular sieve is selected from at least one of ZSM-22, Nu-10, KZ-2 and ISI-1, wherein the ZSM-22 molecular sieve is preferred. The molar ratio of silicon to aluminum in said TON molecular sieve is 50 to 200, preferably 70 to 150. Said TON molecular sieve is preferably H-TON molecular sieve. A directly synthesized TON molecular sieve generally contains the cations of alkali metals or alkaline earth metals, and the H-TON molecular sieve can be obtained by a conventional method of calcination after being exchanged with ammonium ions.

In the above catalyst, said rare earth elements are well-known for one skilled in the art, comprising at least one of lanthanum, cerium, praseodymium, neodymium, promethium, samarium, europium, dysprosium, gadolinium, erbium, thulium, yttrium and lutetium, preferably lanthanum and/or cerium.

In the above catalyst, said metal of group VIII is preferably platinum and/or palladium, more preferably platinum.

In the above catalyst, said inorganic refractory oxide is selected from at least one of aluminum oxide, titanium oxide, silicon oxide, boron oxide, magnesium oxide and clay, preferably aluminum oxide and/or silicon oxide, further preferably aluminum oxide.

The specific surface area of said catalyst in the present invention is 200 to 350 m$^2$/g, and the pore volume is 0.3 to 0.5 ml/g. The specific surface area and pore volume of said catalyst in the present invention are obtained by using ASAP2400 according to the liquid nitrogen adsorption method at low temperatures and after BET calculation.

The present invention also provides the preparation method for the above catalyst, comprising
a) loading rare earth on a TON molecular sieve, and obtaining the TON molecular sieve modified by rare earth after drying and calcining treatments,
b) loading zirconium on an inorganic refractory oxide, and obtaining the inorganic refractory oxide modified by zirconium oxide after drying and calcining treatments,
c) kneading the TON molecular sieve modified by rare earth and inorganic refractory oxide modified by zirconium oxide and forming, and obtaining the catalyst carrier after drying and calcining treatments,
d) loading the metal of group VIII on the carrier, and obtaining the catalyst for paraffin shape-selective isomerization after drying and calcining treatments.

In the above preparation method, the ion exchange method, the impregnating method or the kneading method can be used in loading rare earth on said molecular sieve in step a). When the ion exchange method or the impregnating method is used, the rare earth-containing compounds used in preparing the rare earth-containing solution are selected from one or more of oxides, chlorides, nitrates, sulfates and carbonates, preferably chlorides and/or nitrates, more preferably nitrates. When the kneading method is used, the rare earth-containing solution is fully mixed with the molecular sieve. The compounds used in preparing rare earth-containing solution are selected from one or more of oxides, chlorides, nitrates, sulfates and carbonates, preferably oxides and/or nitrates, further preferably oxides.

In the above preparation method, the impregnating method or the kneading method can be used for loading zirconium on the inorganic refractory oxide in step b). When the impregnating method is used, the zirconium-containing compounds used in preparing zirconium-containing solution are one or more selected from zirconium nitrate, zirconyl chloride, zirconium sulfate, zirconyl sulfate and zirconium isopropoxide, preferably zirconium nitrate and/or zirconium chloride, more preferably zirconium nitrate. When the kneading method is used, the zirconium-containing solution is fully mixed with the precursor of the inorganic refractory oxide. The compound for preparing zirconium-containing solution is one or more of zirconium oxide, zirconium nitrate, zirconyl chloride, zirconium sulfate and zirconyl sulfate, preferably zirconium nitrate and/or zirconium oxide, further preferably zirconium oxide. The inorganic refractory oxide is selected from at least one of aluminum oxides, titanium oxides, silicon oxides, boron oxides, magnesium oxides, kaolin and clay, preferably aluminum oxides and kaolin, more preferably aluminum oxides. The precursor of aluminum oxides can be selected from at least one of boehmite, pseudo-boehmite, diaspore, gibbsite and bayerite, preferably pseudo-boehmite.

In the above preparation method, the specific methods in step c) can comprise fully kneading the TON molecular sieve modified by rare earth, inorganic refractory oxides modified by zirconium oxide, an extrusion assistant, water and a peptizator to obtain a plastic paste, extrusion molding, and obtaining the catalyst carrier after drying and calcining treatments. Said peptizator can be inorganic acids or organic acids, preferably inorganic acids, more preferably hydrochloric acids and nitric acids, and most preferably nitric acids, wherein the mass concentration of nitric acids solution is 1.0 to 30.0%, preferably 1.0 to 5.0%. The dosage is determined by whether it enables the kneading materials to be plastic lumps. An extrusion assistant can be used in the catalyst molding process of step c) to benefit the extrusion molding, such as graphite, starch, cellulose, sesbania powders and so on.

In the above preparation method, the conventional metal loading methods are used as said loading method in step d), such as the impregnating method or the ion exchange method, preferably the impregnating method, more preferably the saturated impregnating method. The saturated impregnating method is to prepare a solution of the saturated adsorption amount of a carrier by a certain amount of hydrogenation component compounds, and then mix the solution with the carrier. The hydrogenation component compounds are the salts which are dissolved in water and commonly used in the field, such as chloroplatinic acid solution, platinum amine complex solution, palladium amine complex solution, palladium nitrate solution, palladium chloride solution and organic complex solutions thereof.

Said drying conditions in the four steps of the above preparation method can be the same, such as drying at room temperatures to 300° C. for 1 to 48 h, or said drying conditions can be different from each other. The calcination conditions in steps a), b) and c) can be the same, such as calcining at 400 to 900° C. for 0.5 to 10.0 h, or said calcination conditions can be different from each other. Said calcination condition in step d) is at 300 to 600° C. for 1 to 8 h.

The present invention also provides a shape-selective isomerization process for paraffins, wherein raw oil containing paraffins is isomerized in the presence of the above catalyst.

In the above process, said raw oil containing paraffins can be the raw material with the initial distilled points equal to or higher than 140° C., such as diesel oil, white oil, atmospheric heavy distillate oil (AGO), vacuum distillate oil (VGO), hydrocracking tail oil or wax. The above method is particularly suitable for the treatment of lubricating oil distillates with high paraffin content. As to the paraffin-containing raw oil with high sulfur or nitrogen impurity content, the isomerization treatment generally needs to be carried out after the hydrorefining treatment.

In the above process, the isomerization conditions are as follows. The hydrogen pressure is 2 to 20 MPa, the temperature is 260 to 400° C., the volume space velocity is 0.5 to 4.0 h$^{-1}$, and the volume ratio of hydrogen to raw material containing paraffins is 200 to 1000. Preferably, the hydrogen pressure is 5 to 10 MPa, the temperature is 320 to 380° C., the volume space velocity is 1.0 to 3.0 h$^{-1}$, and the volume ratio of hydrogen to raw material containing paraffins is 300 to 900.

The reduction treatment of the catalyst in the present invention needs to be carried out before the catalyst is used. The reduction treatment conditions are as follows. Under hydrogen atmosphere, the temperature is 300 to 500° C., the pressure is 0.5 to 10 MPa, and the time is 1 to 12 h.

The catalyst of the present invention comprises a catalyst carrier and an active metal component of group VIII. The solid acidity of the catalyst carrier provides an ismoerization active center. The rare earth elements can react with B acid site of a molecular sieve to decrease the acid strength of the molecular sieve and generate more acid sites, which provides more active sites for the catalyst, thus preventing side reactions such as coke and carbon deposites of strong acid sites and obviously improving the activity and stability of the catalyst. The inorganic refractory oxides after being modified by zirconium can generate a large amount of L acid sites, the accepting electron properties of which can improve the effect of the catalyst and paraffins so as to increase the touching chance of paraffins with the active sites in the catalyst. At the same time, the large number of generated L acid sites can promote the dehydrogenation of paraffins to generate more isomerism intermediates so as to improve the isomerization selectivity of the catalyst. The synergistic effect of TON molecular sieves modified by rare earth and inorganic refractory oxides modified by zirconium, can adjust the acidity of the catalyst surface, strengthen the acidic centers and acid strength in different locations respectively, and purposefully promote the isomerization activity of paraffins while suppressing the occurrence of side reactions. The hydrogenation/dehydrogenation active center provided by the active metal components of group VIII has a fast hydrogenation/dehydrogenation activity. It can prevent further isomerization and even cracking of tert-carbocations and reduce the generation of side reactions.

The synergistic effect of the catalyst carrier prepared by the TON molecular sieve modified by rare earth and inorganic refractory oxides modified by zirconium and the loaded active metal components of group improves the activity of the catalyst in catalyzing the isomerization of paraffins, reduces the number of side reactions such as cracking reaction, increases the isomerization selectivity of the catalyst, lowers the solidifying points of the raw oil containing paraffins and improves the yield of liquid products. Especially, when used in the isomerization dewaxing process of lubricating oil distillates with high paraffin content, the catalyst has the advantage of enabling base oil for lubricating oil with a higher product yield, a lower pour point (solidifying point) and a higher viscosity index. Simply introducing zirconium oxide into the catalyst cannot bring about the above effects. As shown in the comparative examples of the present invention, the catalyst contained by compositing the mechanical mixture of zirconium oxide and aluminum oxide with the TON molecular sieve modified by rare earth and then loading active metals of group cannot bring about the above effects. Only the carrier composed of inorganic refractory oxides modified by loading zirconium and TON molecular sieves modified by rare earth can generate the synergistic effects, and only said catalyst obtained in the present invention has the effects of improving isomerization selectivity and reducing the number of the side reactions.

The catalyst provided in the present invention can be applied in the isomerization dewaxing process of any raw materials containing paraffins, especially in the isomerization dewaxing process of lubricating oil distillates with high paraffin content with the advantages of a higher product yield of base oil for lubricating oil, a lower pour point (solidifying point) and a higher viscosity index, and therefore a higher application value.

EMBODIMENT

The present invention will be explained in detail by the following examples, which are not to restrict the scope of the present invention in any manner.

Example 1

The Preparation of Catalyst E-1

(1) The preparation of a H-TON molecular sieve

The TON molecular sieve used in the present invention is prepared according to the process in Example 1 of CN1565969A. The molar ratio of silicon to aluminum in the obtained molecular sieve is 92, the specific surface area thereof is 223 m$^2$/g, and the pore volume thereof is 0.21 ml/g;

The above synthesized TON molecular sieve contains the cations of alkali metals or alkaline earth metals, which after being exchanged with ammonium ions, are calcined in the air for 1 to 10 h at 316 to 540° C. The obtained H molecular sieve is numbered as S-1;

(2) taking 1000 g of lanthanum nitrate solution with a mass concentration of 20% (calculated on lanthanum oxide) to fully mix with 800 g of S-1 molecular sieves, drying the mixture at 130° C. for 24 h and calcining it at 750° C. for 3 h, and finally obtaining the modified S-1 molecular sieves with a mass content of lanthanum oxide of 20%, which is numbered as LS-1 molecular sieve;

(3) fully mixing 500 g of zirconium nitrate solution with a mass concentration of 10% (calculate on zirconium oxide) with 450 g of aluminium hydroxide (calculated on aluminum oxide) (SB, produced by Condean, Germany), drying the mixture at 50° C. for 48 h, calcining it at 400° C. for 8 h, and finally obtaining the modified aluminum oxide with a mass content of zirconium oxide of 10%, which is numbered as GS-1 aluminum oxide;

(4) mixing 100 g of LS-1 molecular sieves, 100 g of GS-1 aluminum oxide and 10 g of sesbania powders uniformly, adding 230 g of water and 14 ml of concentrated nitric acid (the mass concentration is 66.5%), fully kneading the mixture to a pasty plastic matter, and extruding it into cylindrical strips with a diameter of 1.5 mm in an extruder; drying the cylindrical strips at 100° C. for 16 h and calcining them at 550° C. for 4 h in the air to obtain the catalyst carrier ES-1 of the present invention;

(5) saturated impregnating 100 g of ES-1 with a solution containing [Pt(NH$_3$)$_4$]Cl$_2$, drying the mixture at 100° C. for 8 h, calcining it at 500° C. for 3 h in the air, and obtaining the catalyst containing 0.38 wt % of Pt. The data are shown in Table 1.

Isomerization Dewaxing Reaction

The reaction raw material is lubricating oil distillate containing paraffin. The main properties thereof are shown in Table 1. The isomerization dewaxing reaction is carried out in a 200 ml middle-sized fixed bed reactor. The loading amount of catalyst is 200 ml. The pre-reduction of catalyst is carried out before feeding the material so that the active metal in the catalyst will be in a reduction state. The reduction conditions are as follows. The temperature is 400° C., the pressure is 6.0 MPa, and the time is 8 h. The reaction conditions and data are shown in Table 3.

TABLE 1

The main properties of raw oil

| | |
|---|---|
| Density (20° C.), kg/m$^3$ | 861.1 |
| Sulphur, μg/g | 4.0 |
| Nitrogen, μg/g | 1.2 |
| Viscosity (40° C.), mm/s$^2$ | 29.69 |
| Pour point, ° C. | 21 |
| Wax content, wt % | 9.8 |
| Distillation Range, ° C. (D1160) | |
| IBP/10% | 227/399 |
| 30%/50% | 428/441 |
| 70%/90% | 455/469 |
| 95%/EBP | 477/500 |

Note:
IBP and EBP indicate the initial distilled point and the final distilled point respectively.

Example 2

The preparation of catalyst is similar to that in Example 1 except that lanthanum nitrate is substituted by cerium nitrate, the solution containing $H_2PtCl_6$ is used in saturated impregnation, and catalyst E-2 of the present invention with 0.74% of Pt contained is prepared. The data of the catalyst are shown in Table 2. The reaction raw materials and reduction treatment conditions are similar to those in Example 1. The reaction conditions and data are shown in Table 3.

Example 3

The preparation of catalyst is similar to that in Example 1 except that the mass ratio of modified molecular sieves to inorganic refractory oxides in the carrier is 3:7, wherein the mass content of lanthanum oxide in the molecular sieves is 35%, the mass content of zirconium oxide in the inorganic refractory oxides is 15%, the used TON molecular sieves are H-Nu-10 molecular sieves, the used refractory oxides are the mixture of kaolin and aluminum oxides, and the solution containing $Pd(NO_3)_2$ is used in the saturated impregnation. The used Nu-10 molecular sieves are prepared according to the process in Example 1 of U.S. Pat. No. 4,900,528, wherein the molar ratio of silicon to aluminum of the obtained molecular sieves is 86, the specific surface area is 213 m$^2$/g, and the pore volume thereof is 0.20 ml/g; and they are converted into acidic Nu-10 molecular sieves, i.e., H-Nu-10 molecular sieves according to the method in Example 1, which are numbered as S-2. Catalyst E-3 of the present invention with 2.0% of Pd contained is prepared. The data of catalyst are shown in Table 2. The reaction raw materials and reduction treatment conditions are similar to those in Example 1. The reaction conditions and data are shown in Table 3.

Example 4

The preparation of catalyst is similar to that in Example 1 except that the mass ratio of modified molecular sieves to inorganic refractory oxides in the carrier is 3:7, wherein the mass content of lanthanum oxide in the molecular sieves is 35%, the mass content of zirconium oxide in the inorganic refractory oxides is 15%, the solution containing $[Pt(NH_3)_4]Cl_2$ is used in the saturated impregnation, and catalyst E-4 of the present invention with 1.05% of Pt contained is prepared. The data of the catalyst are shown in Table 2. The reaction raw materials and reduction treatment conditions are similar to those in Example 1. The reaction conditions and data are shown in Table 3.

Example 5

The preparation of catalyst is similar to that in Example 1 except that the mass ratio of modified molecular sieves to inorganic refractory oxides in the carrier is 6:4, wherein the mass content of lanthanum oxide in the molecular sieves is 30%, the mass content of zirconium oxide in the inorganic refractory oxides is 20%, the solution containing $[Pt(NH_3)_4]Cl_2$ is used in the saturated impregnation, and catalyst E-5 of the present invention with 0.52% of Pt contained is prepared. The data of the catalyst are shown in Table 2. The reaction raw materials and reduction treatment conditions are similar to those in Example 1. The reaction conditions and data are shown in Table 3.

Example 6

The preparation of catalyst is similar to that in Example 1 except that the mass ratio of modified molecular sieves to inorganic refractory oxides in the carrier is 7:3, wherein the mass content of lanthanum oxide in the molecular sieves is 15%, the mass content of zirconium oxide in the inorganic refractory oxides is 25%, the mixture of solution containing $H_2PtCl_6$ and $Pd(NO_3)_2$ is used in the saturated impregnation, and catalyst E-6 of the present invention with 0.21% of Pt and 0.40% of Pd contained is prepared. The data of the catalyst are shown in Table 2. The reaction raw materials and reduction treatment conditions are similar to those in Example 1. The reaction conditions and data are shown in Table 3.

Example 7

The preparation of catalyst is similar to that in Example 1 except that the mass ratio of modified molecular sieves to inorganic refractory oxides in the carrier is 8:2, wherein the mass content of lanthanum oxide in the molecular sieves is 12%, the mass content of zirconium oxide in the inorganic refractory oxides is 28%, the solution containing $[Pt(NH_3)_4]Cl_2$ is used in the saturated impregnation, and catalyst E-7 of the present invention with 0.38% of Pt contained is prepared. The data of the catalyst are shown in Table 2. The reaction raw materials and reduction treatment conditions are similar to those in Example 1. The reaction conditions and data are shown in Table 3.

Comparative Example 1

The preparation of catalyst is similar to that in Example 2 except that, the used molecular sieves are not treated with the solution containing rare earth elements, aluminium oxide is not treated with zirconium oxide, the solution containing $[Pt(NH_3)_4]Cl_2$ is used in the saturated impregnation, and comparative catalyst C-1 of the present invention with 0.73% of Pt contained is prepared. The data of the catalyst are shown in Table 2. The reaction raw materials and reduction treatment conditions are similar to those in Example 1. The reaction conditions and data are shown in Table 3.

Comparative Example 2

The catalyst is prepared according to the preparation method in Example 1 of CN200610134164.9. First load lanthanum oxide with a mass content of 10% on the used molecular sieves, then fully mix said molecular sieves with SB aluminium oxide, then add dilute nitric acid and an appropriate amount water, knead the mixture to plastic lumps, and extrude them into cylindrical strips with a diameter of 1.2 mm; obtain the catalyst carrier after thermostatting the molded products at 110° C. for 8 h and then at 550° C. for 4 h in the air; saturated impregnate the carrier with a solution containing [Pt(NH$_3$)$_4$]Cl$_2$, dry it at 150° C. for 4 h and calcine it at 550° C. for 6 h in the air, and obtain the catalyst containing 0.38 wt % of Pt. The data are shown in Table 2. The reaction raw materials and reduction treatment conditions are similar to those in Example 1. The reaction conditions and data are shown in Table 3.

Comparative Example 3

The preparation of catalyst is similar to that in Example 1 except that, the inorganic refractory oxides are the mechanical mixture of aluminium oxide and zirconium oxide, wherein the mass ratio of aluminium oxide to zirconium oxide is 9:1. The molecular sieves, aluminium oxide, zirconium oxide and sesbania powders are mixed uniformly, which is then saturated impregnated with a solution containing [Pt(NH$_3$)$_4$]Cl$_2$ and comparative catalyst C-3 containing 0.73% of Pt is obtained according to the method and procedures in Example 1. The data of the catalyst are shown in Table 2. The reaction raw materials and reduction treatment conditions are similar to those in Example 1. The reaction conditions and data are shown in Table 3.

TABLE 2

The data of catalysts

|  | Catalyst | Modified molecular sieves:Midified Al$_2$O$_3$ wt:wt | La$_2$O$_3$① wt % | ZrO$_2$② wt % | Pt wt % | Pd wt % | Specific surface area m$^2$/g | Pore volume ml/g |
| --- | --- | --- | --- | --- | --- | --- | --- | --- |
| Example 1 | E-1 | 50:50 | 20.0 | 10.0 | 0.38 | — | 244 | 0.33 |
| Example 2 | E-2 | 50:50 | 20.0③ | 10.0 | 0.74 | — | 261 | 0.41 |
| Example 3 | E-3 | 30:70④ | 35.0 | 15.0 | — | 2.0 | 248 | 0.34 |
| Example 4 | E-4 | 30:70 | 35.0 | 15.0 | 1.05 | — | 232 | 0.30 |
| Example 5 | E-5 | 60:40 | 30.0 | 20.0 | 0.52 | — | 230 | 0.35 |
| Example 6 | E-6 | 70:30 | 15.0 | 25.0 | 0.21 | 0.40 | 240 | 0.35 |
| Example 7 | E-7 | 80:20 | 12.0 | 28.0 | 0.38 | — | 239 | 0.32 |
| Comparative Example 1 | C-1 | 50:50 | 0 | 0 | 0.73 | — | 246 | 0.36 |
| Comparative Example 2 | C-2 | 75:25 | 10 | 0 | 0.38 | — | 242 | 0.33 |
| Comparative Example 3 | C-3 | 50:50 | 20.0 | 10.0 | 0.38 | | 252 | 0.35 |

①based on modified molecular sieves;
②based on the mass of modified refractory oxides;
③cerium oxide;
④30 wt % of kaolin and 70% of aluminum oxide;
⑤the mechanical mixture of zirconium oxide and aluminium oxide.

TABLE 3

Isomerization dewaxing reactions

|  | Example 1 | Example 2 | Example 3 | Example 4 | Example 5 | Example 6 | Example 7 | Comparative Example 1 | Comparative Example 2 | Comparative Example 3 |
| --- | --- | --- | --- | --- | --- | --- | --- | --- | --- | --- |
| catalyst | E-1 | E-2 | E-3 | E-4 | E-5 | E-6 | E-7 | C-1 | C-2 | C-3 |
| Reaction pressure, MPa | | | | | | 9 | | | | |
| Space velocity h$^{-1}$ | | | | | | 1.0 | | | | |
| Ratio of hydrogen to oil | | | | | | 800 | | | | |
| Reaction temperature, ° C. | 335 | 345 | 337 | 340 | 338 | 330 | 338 | 328 | 330 | 330 |
| C$_5$$^+$ liquid phase yield, wt % | 97.2 | 98.6 | 98.4 | 97.1 | 98.7 | 96.9 | 97.2 | 90.2 | 92.4 | 93.8 |
| Yield of base oil for lubricating oil, wt % | 82.3 | 83.4 | 84.8 | 83.6 | 82.4 | 80.3 | 78.7 | 73.6 | 74.6 | 74.9 |
| viscosity index of base oil for lubricating oil | 126 | 129 | 128 | 129 | 128 | 128 | 125 | 106 | 112 | 113 |
| Pour point of the base oil for lubricating oil, ° C. | −22 | −23 | −21 | −22 | −21 | −22 | −22 | −22 | −21 | −21 |

It can be seen from the data in Table 3, compared with the comparative catalysts, when the catalysts provided by the present invention are used for the hydrogenation isomerisation process of lubricating oil distillates, and when the pour points of the base oil for lubricating oil are close, the yield of liquid phase $C_5^+$ is increased by 3 to 8 wt %, the yield of base oil for lubricating oil is increased by 3 to 10 wt %, and the viscosity index of products is increased by at least 10%.

The invention claimed is:

1. A method of preparing a catalyst for paraffin isomerization, comprising:
   a) mixing one or more rare earth compounds with a TON molecular sieve to form a first mixture, drying and calcining the first mixture to obtain a TON molecular sieve modified by one or more rare earth oxides;
   b) mixing one or more zirconium compounds with an inorganic refractory oxide to form a second mixture, drying and calcining the second mixture to obtain an inorganic oxide modified by zirconium oxide;
   c) kneading the TON molecular sieves comprising one or more rare earth oxides and the inorganic refractory oxide modified by zirconium oxide to form a third mixture, drying and calcining the third mixture to obtain a catalyst carrier; and
   d) loading a compound of a noble metal of group VIII on the catalyst carrier to obtain a catalyst precursor, drying and calcining the catalyst precursor to obtain the catalyst for paraffin isomerization.

2. The method according to claim 1, wherein said TON molecular sieve is chosen from ZSM-22, Nu-10, KZ-2, ISI-1, or a mixture of one or more thereof.

3. The method according to claim 1, wherein a molar ratio of silicon to aluminum in said TON molecular sieve is 50 to 200.

4. The method according to claim 1, wherein said inorganic refractory oxide is chosen from aluminum oxide, titanium oxide, silicon oxide, boron oxide, magnesium oxide, clay, or a mixture of at least two or more thereof.

5. The catalyst according to claim 1, wherein said noble metal of group VIII is chosen from platinum, palladium, or a mixture thereof.

6. The method according to claim 1, wherein said rare earth compound is chosen from lanthanum, cerium, praseodymium, neodymium, promethium, samarium, europium, dysprosium, gadolinium, erbium, thulium, yttrium, or lutetium.

7. The method according to claim 1, wherein said TON molecular sieve is H molecular sieve.

* * * * *